United States Patent [19]

Schmidt

[11] Patent Number: 4,801,931
[45] Date of Patent: Jan. 31, 1989

[54] DEVICE FOR CONTROLLING THE MOTION OF A VIDEO-SCREEN CURSOR

[75] Inventor: Michael Schmidt, Boeblingen, Fed. Rep. of Germany

[73] Assignee: Hewlett-Packard Company, Palo Alto, Calif.

[21] Appl. No.: 112,639

[22] Filed: Oct. 22, 1987

[30] Foreign Application Priority Data

Oct. 25, 1986 [EP] European Pat. Off. ........ 86114850.0

[51] Int. Cl.$^4$ .............................................. G09G 3/02
[52] U.S. Cl. .................................. 340/710; 273/148 B
[58] Field of Search ................. 340/706, 709, 710; 74/471 XY, 198; 273/148 B

[56] References Cited

U.S. PATENT DOCUMENTS

| | | | |
|---|---|---|---|
| 3,269,190 | 8/1966 | Laman | 74/471 XY |
| 3,272,025 | 9/1966 | Stieber | 74/198 |
| 3,398,592 | 8/1968 | Brany | 74/198 |
| 3,613,090 | 10/1971 | Mason | 340/710 |
| 4,505,165 | 3/1985 | Wiczer | 74/471 XY |
| 4,538,476 | 9/1985 | Luque | 340/710 |
| 4,562,347 | 12/1985 | Hovey et al. | 340/710 |
| 4,575,086 | 3/1986 | Kim et al. | 74/471 XY |
| 4,581,609 | 4/1986 | Hosogoe et al. | 340/710 |
| 4,700,581 | 10/1987 | Tibbals, Jr. | 74/198 |

FOREIGN PATENT DOCUMENTS

0094133 5/1984 Japan .................................. 340/709

*Primary Examiner*—Gerald L. Brigance
*Assistant Examiner*—Richard Hjerpe
*Attorney, Agent, or Firm*—James M. Williams

[57] ABSTRACT

A trackball for controlling the motion of a video-screen cursor comprises a control ball, said control ball being held on at least two rotatable rolling bodies, said rolling bodies each touching the control ball at at least two contact points. These rolling bodies may, for example, have the shape of a double cone or of two spheres mounted on a shaft. The result is that, once imparted rotary momentum in an initial direction, the control ball retains momentum in that direction, i.e., the video-screen cursor moves in a precisely vertical or precisely horizontal direction across the video screen once it is started in such a direction. Furthermore, in a preferred embodiment, the axial bearing arrangement of the rolling bodies is dispensed with.

15 Claims, 3 Drawing Sheets

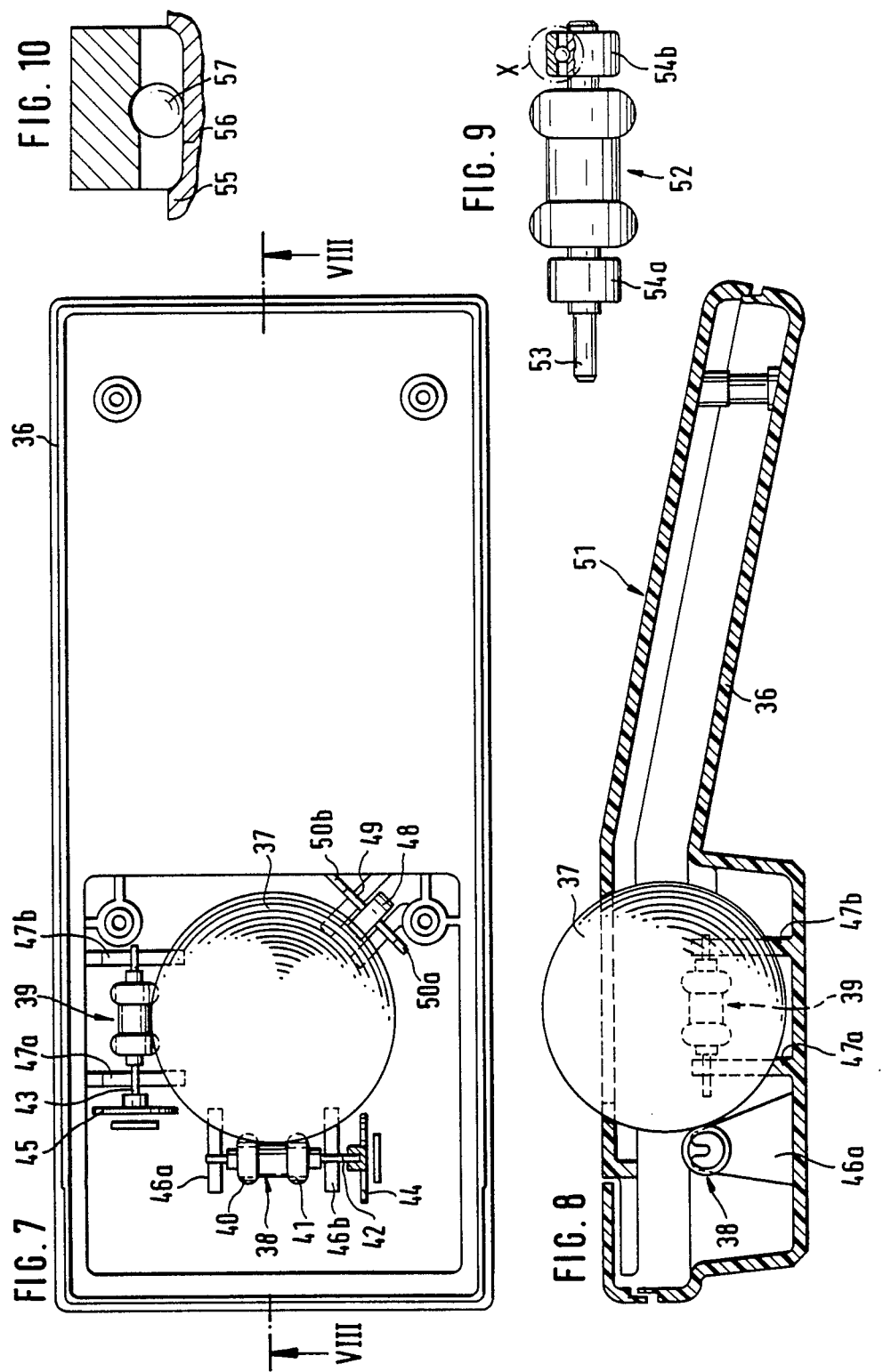

DEVICE FOR CONTROLLING THE MOTION OF A VIDEO-SCREEN CURSOR

BACKGROUND AND SUMMARY OF THE INVENTION

This invention relates to a device for controlling the motion of a video-screen cursor with a movably held control ball, and in particular to the bearing arrangement for such a control ball whereby the rotary motion of the control ball is converted into electrical signals by appropriate decoding means.

Such a control ball device, commonly known as a "trackball", is used, for example, with a computer to control the motion of a pointer or cursor on the video screen. In typical applications, the cursor is moved to a predefined field on the video screen, and a specific function is then selected by pressing a key.

A trackball device is described, for example, in U.S. Pat. No. 4,575,086, which shows a trackball held on three rollers, with two of the rollers mounted at right angles to each other and having decoding disks on their shafts. The decoding disks are provided with apertures which cooperate with an LED and a photodetector to provide a series of pulses as the rollers rotate. The control ball can be moved in both coordinate directions, with one of the decoding disks recording the motion of the ball in each of the coordinate directions. Hence, the cursor can be moved both up or down and to right or left on the video screen. The total device (control ball, rollers, decoders and electronics) is enclosed in a housing, the top side of which has a circular opening through which a part of the control ball protrudes. The operator can manipulate the control ball by placing his fingers on the part that protrudes through the housing.

The bearing arrangement for the control ball described in U.S. Pat. No. 4,575,086 is typical of those employed in devices of this kind. For example, U.S. Pat. No. 4,505,165, discloses a similar bearing arrangement, with two rollers mounted perpendicular to one another, each with a decoding disc, and a third roller to support the control ball.

This arrangement has the disadvantage that the control ball tends to depart from a precisely vertical or horizontal track if it is allowed to freewheel. That is, if the control ball is moved in one coordinate direction only, perpendicularly to the axis of one of the rollers and parallel to the axis of the other roller, and the control ball is briefly set in motion and then released, the control ball, and thus also the cursor, will deviate from the direction as it progresses. This means that the cursor does not move precisely from left to right across the entire screen, but drifts up or down as it moves across the screen. The same problem occurs in the vertical direction, causing the cursor to drift left or right.

It is an object of the present invention to provide a trackball device that maintains the same motion vector when the control ball freewheels. That is, when the control ball is set in motion in one coordinate direction and released, it does not depart from that direction, and thus also the motion vector of the cursor does not change.

This object is achieved by shaping at least one of the rotatable rolling bodies so that it is in contact with the control ball at at least two contact points. The result is that, once imparted a rotary momentum in a direction perpendicular to the axis of one of the rolling bodies, the control ball retains its initial rotary momentum, i.e. the cursor continues to move in the direction of its initial vector without showing any deviations. This is achieved predominantly because the two contact points on the control ball provide increased resistance to rotation in the non-desired direction of motion.

It is advantageous if both rolling bodies have two contact points with the control ball, so that the components of the motion vector in both coordinate directions are maintained.

Although it is not necessary to mount the rolling bodies connected to the decoders at right angles to one another, it is advantageous to do so, since one of the coordinates on the screen can then be assigned directly to one of the axes without having to perform a vectorial conversion. Moreover, the cursor will usually be moved either vertically or horizontally.

The additional support for the control ball may be provided by a third roller or by two additional rollers, which may be constructed with one contact point or which may also be designed with two contact points in accordance with the present invention.

In a preferred embodiment of the invention, the cross section of the rotatable rolling body is such that the diameter at two locations, situated along the axis of the rolling body and on opposite sides of the minimum clearance point on the axis with respect to the surface of the control ball, is larger than the diameter at the minimum clearance point. Thus the rolling body supports the control ball at two points situated on either side of the perpendicular from the center of the control ball to the axis of the rolling body. When the control ball is placed in position, the rolling body is automatically centered and held in position. This makes it possible for the rotatable rolling body to be mounted without a stop in the axial direction. This permits a considerably simpler mounting to be used, such as a shaft connected to the rolling body inserted into a groove in a support. In comparison, the conventional bearing arrangements require axial stops, for example, the toe-bearing arrangement disclosed in U.S. Pat. No. 4,575,086.

In the preferred embodiment, the rolling body has the shape of a truncated double cone, in which the end faces of smaller diameter abut. In an alternative embodiment, the rolling body comprises two disk-like bodies or spheres mounted on a shaft. In another alternative embodiment the rolling body has a concave surface contour that matches the curvature of the control ball and contacts the control ball at points in a plane passing through the axis of the rolling body and through the center of the control ball.

BRIEF DESCRIPTION OF THE DRAWINGS

Further features and advantages will become apparent from the drawings and the following detailed description of several embodiments of the invention.

FIG. 7 shows the top view of a housing of a control device according to the invention, said housing being open at the top.

FIG. 8 shows a section along reference line VIII—VIII in FIG. 7.

FIG. 9 shows an example of the bearing arrangement of the shaft of a rolling body constructed according to the invention.

FIG. 10 shows detail X from FIG. 9.

DETAILED DESCRIPTION OF THE INVENTION

Figure 1:
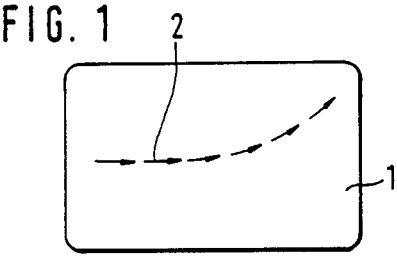
FIG. 1 shows the video-screen cursor of a conventionally mounted trackball when the control ball is set in motion from left to right and is then released.

FIG. 1 shows a video screen 1 on which the motion 2 of a cursor is represented. This example illustrates the use of a conventionally mounted trackball, when the control ball was set in motion from left to right and then released. It can be seen that, as it progresses, the initially precisely horizontal or rightward-extending motion vector of the cursor is given a vertical, in this case, upward-pointing, motion component. This phenomenon is caused by the unstable dynamic equilibrium of the bearing arrangement, since, in the known devices, the control ball is held on cylindrical rollers, i.e. the control ball has only one point of contact with respect to each roller. Consequently, the motion of the cursor does not end as intended in the center of the right-hand edge of the screen shown in FIG. 1, but above this point.

Figure 2:
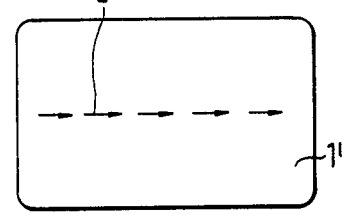
FIG. 2 shows the behavior of the video-screen cursor when a trackball mounted according to the invention is set in motion from left to right and is then released.

If a trackball mounted according to the invention is used, the same operation leads to an absolutely linear motion of the cursor, as is shown by motion 2 on video screen 1 in FIG. 2.

Figure 3:
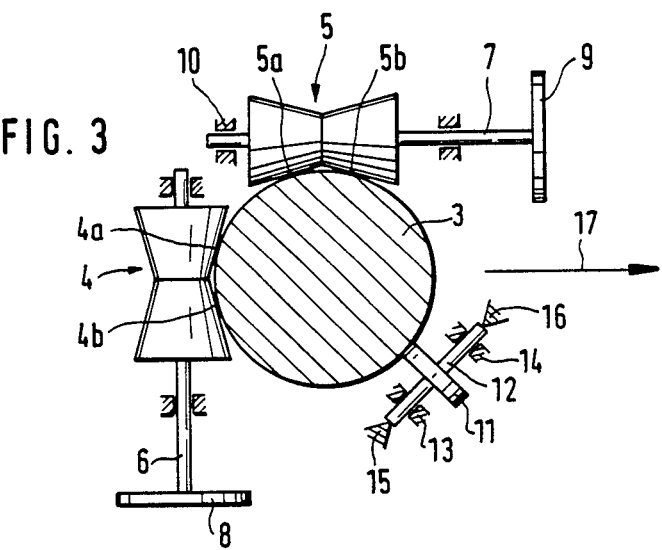
FIG. 3 shows the schematic representation of a first embodiment of the invention.

FIG. 3 shows a first embodiment of the invention in a schematic sectional representation. A control ball 3 is shown in section in order better to be able to show its contact with the rotatable rolling bodies. In this connection, the plane of the section does not pass through the center of the control ball.

The control ball 3 rests on two rotatable rolling bodies 4 and 5, the axes of which are disposed perpendicularly to one another. Each of these rolling bodies has the geometrical shape of a truncated double cone. As a result, each rolling body has two contact points with the control ball 3, these contact points being identified by reference numbers 4a and 4b, and 5a and 5b, respectively. Each of the rolling bodies 4 and 5 is seated on a corresponding shaft 6 and 7, which also bear the encoding disks 8 and 9, respectively. The discs are provided with openings scanned by photodetectors, not shown in FIG. 3. The photodetectors convert the rotary motion of the respective rolling body into a corresponding electrical signal, for example into a pulse train, in order to control the cursor. It is also possible and well known to use two photodetectors in quadrature for each of the decoding disks 8 and 9 to detect not only the rotary speed, but also the rotary direction of the rolling body.

The rolling bodies 4 and 5 may be of one-piece construction, e.g. they may be manufactured from steel in a lathe. In the preferred embodiment, however, only the shafts 6 and 7 are made of steel, while the conical surfaces coming into contact with control ball 3 are made of plastic. This reduces the rolling noise of the control ball 3.

The shafts 6 and 7 are held as indicated only schematically, e.g. by bearing 10. However, no axial stops are necessary; on the contrary, the shafts 6 and 7 (which are rigidly connected to the rolling bodies 4 and 5) are free to move in the axial direction. Alternatively, it is also possible to provide stops, but to leave the shafts a certain amount of play. When the control ball 3 is placed on the rolling bodies 4 and 5, the latter slide, because of their axial play, automatically into the positions shown, in which they contact the control ball 3 with two contact points, in any case no later than when the control ball is moved the first time. This dispenses with the need for expensive axial bearing arrangements, for example, toe-bearing arrangements. Furthermore, it reduces the friction caused by the bearings.

The control ball 3 is held at additional points; in the example shown, at a disk 11. The nature of this bearing arrangement is not decisive with regard to the present invention; in the example shown, disk 11 is seated on a shaft 12 which is held in the circumferential direction by bearings 13 and 14, as well as in the axial direction by bearings 15 and 16. Of course, a rolling body of the kind provided with reference numbers 4 and 5 can replace the bearing disk 11.

When the control ball 3 is imparted a momentum in the direction of arrow 17 and the control ball is then released, it maintains its rotary momentum in the initial direction because of the guidance at points 4a and 4b (the "static" friction at these points exceeds the sliding friction at points 5a and 5b), i.e. only the rolling body 4 rotates. This guarantees that the cursor moves only as shown in FIG. 2. The same applies, of course, to motion in the vertical direction, for which only rolling body 5 rotates.

Figure 4:
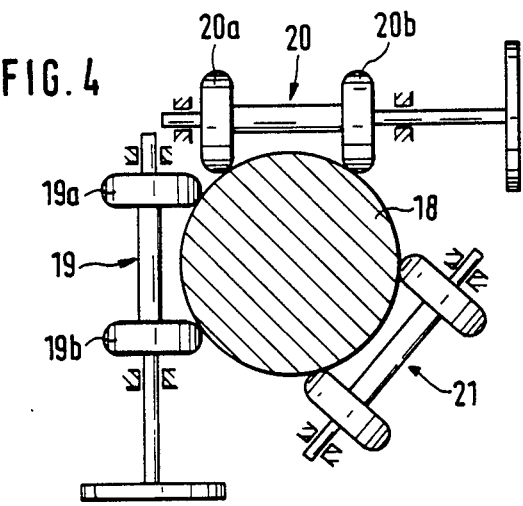
FIG. 4 shows the schematic representation of a second embodiment of the invention.

FIG. 4 shows an alternative embodiment of the invention, in which the control ball 18 is in contact with two rolling bodies 19 and 20, more specifically with disk-like bodies 19a and 19b, and 20a and 20b. Other than the shape of the rolling bodies, the embodiment shown in FIG. 4 is, both in design and in its behavior, the same as the embodiment shown in FIG. 3. The third bearing point is in this case provided by a rolling body 21 similar to the rolling bodies 19 and 20. In contrast to the disk ll shown in FIG. 3, rolling body 21 has no axial bearing arrangement.

Figure 5:
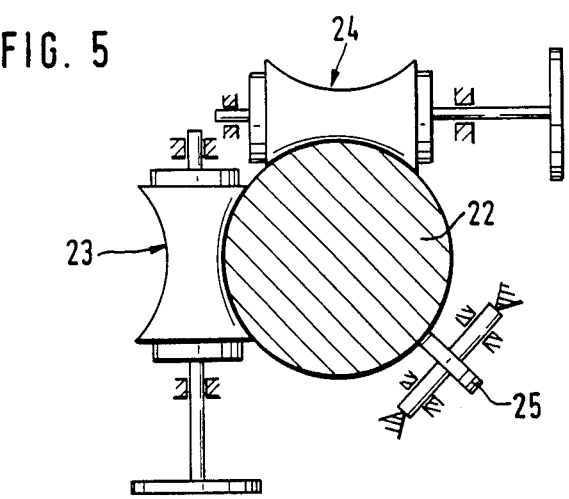
FIG. 5 shows the schematic representation of a third embodiment of the invention.

FIG. 5 shows another alternative embodiment with the rolling bodies 23 and 24 in contact with the control ball 22. In this embodiment, the cross sectional shape of the rolling bodies 23 and 24 is a concave circular arc that matches the curvature of the control ball. The rolling bodies 23 and 24 contact the control ball at points in the plane of contact with the control ball 22. This results in a linear contact between the rolling bodies and the control ball 22, which, in principle, corresponds to an infinite number of points of contact. In this embodiment, the bearing arrangement on the opposite side of the control ball is once again accomplished by means of an axially held disk 25.

Figure 6:
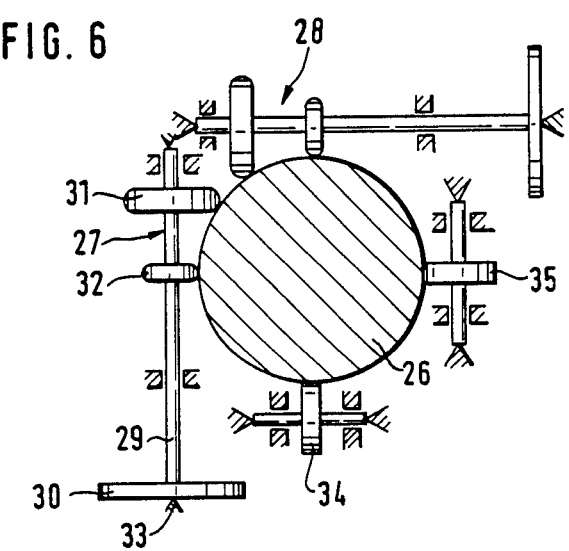
FIG. 6 shows the schematic representation of a fourth embodiment of the invention.

FIG. 6 shows an alternative embodiment in which in each rolling body has only one contact point away from the minimum clearance point, and the second contact point at the minimum clearance point, opposite the center of the control ball 26. The rolling body 27 consists of a shaft 29 bearing a decoding disk 30 and two disks 31 and 32. The disk 32 is at the minimum clearance location on the shaft 29. Like the disk 31, it is in contact with the control ball. The rolling body 28 is basically of identical construction. This configuration also functions so that the control ball maintains its rotary momentum in the initial direction imparted to it. In this embodiment, however, it is necessary to have an axial bearing arrangement, as indicated by reference number 33. The additional bearing disks 34 and 35 are also held axially.

Finally, FIG. 7 and FIG. 8 show a trackball installed in a housing. The components such as the photodetectors and electronics which are not relevant to the present invention have been omitted. FIG. 7 shows a top view of the housing with the cover removed. FIG. 8 shows a sectional view along reference line VIII—VIII in FIG. 7, but with the cover in position.

In FIG. 7, the housing of the trackball is identified in general as 36. In contrast to FIGS. 3 to 6, the control ball 37 is not shown in section and therefore partially hides the rolling bodies on which it is held.

The rolling bodies 38 and 39 each contact the control ball 37 with two bead-shaped or disk-shaped portions of enlarged diameter, e.g., 40 and 41 on rolling body 38. The rolling bodies may be made of hardened and ground steel. Alternatively, they can be made of plastic, which reduces the rolling noise of the control ball during operation. Each of the rolling bodies is seated on a shaft (identified by 42 and 43, respectively); the rolling body itself may, for example, have a press fit on said shaft, or may be molded on, or may also, if the rolling body itself is made of metal, be manufactured in one piece with the shaft. At their ends, the shafts 42 and 43 bear decoding disks 44 and 45, respectively, which are provided with openings scanned by the photodetectors (not shown here). The shafts 42 and 43 are seated in vertical grooves of carrying supports 46a and 46b, and 47a and 47b, respectively, so the shafts are free to move in the axial direction. The nature of this bearing arrangement is shown in more detail in FIG. 8.

The third bearing point of control ball 37 is a disk 48, seated on a shaft 49 which is held axially by members 50a and 50b. The disc 48 could alternatively be replaced by a rolling body of the kind as bodies 38 and 39, dispensing with the need for an axial bearing arrangement.

FIG. 8 shows clearly how control ball 37 and its bearing arrangement are fitted into the housing. The trackball can be operated by placing the ball of the hand on the inclined surface 51 of the housing cover and by moving the control ball 37 with the fingers.

FIG. 9 shows another alternative bearing arrangement providing free axial mobility of the shaft of a rolling body. In this arrangement, the shaft 53 connected to the rolling body 52 is held, with axial play, in ball bearings 54a, 54b. The design details of such a bearing are shown in FIG. 10, which shows detail X from FIG. 9 in an enlarged representation. The ring 55, which is mounted with the shaft 53, has an annular recess 56, which is wide enough so the ball 57 is able to move axially in it. This design is slightly more elaborate than holding the shaft in grooves, but guarantees a still further reduction in rolling friction.

What is claimed is:

1. A device for controlling the motion of a video-screen cursor, comprising:
    a movably held control ball;
    bearing means for supporting the control ball comprising at least two rotatably mounted rolling bodies in contact with the control ball; and
    means for converting the rotary motion of the rolling bodies into electrical signals which control the motion of the cursor;
    wherein at least one of the rolling bodies has an axial cross section having a change of diameter in the axial direction such that the rolling body is in contact with the control ball at at least two points, said axial cross section rotationally symmetric at least at those axial coordinates where the rolling body is in contact with the control ball, whereby the same motion vector of the control ball is maintained when the control ball freewheels.

2. A device according to claim 1, wherein the cross section of the rolling body is such that the diameter of the rolling body at a location, along the axis of the rolling body and away from the minimum clearance point on the axis with respect to the surface of the control ball, is larger than the diameter at the minimum clearance point.

3. A device according to claim 1, wherein the cross section of the rolling body is such that the diameter of the rolling body at at least two locations, situated along the axis of the rolling body and on opposite sides of the minimum clearance point on the axis with respect to the surface of the control ball, is larger than the diameter at the minimum clearance point.

4. A device according to claim 3 wherein the rolling body is connected to a shaft held in the axial direction without a stop at either end.

5. A device according to claim 3, wherein the shaft is held, with axial play, in ball bearings at both ends.

6. A device according to claim 3, wherein the rolling body has the shape of a double truncated cone in which the end faces of smaller diameter abut.

7. A device according to claim 3, wherein the rolling body comprises two disk-like bodies mounted on a shaft.

8. A device according to claim 3, wherein the rolling body has the geometrical shape of two spheres mounted on a shaft.

9. A device according to claim 3, wherein the cross sectional shape of the rolling body is a concave arc that matches the curvature of the control ball so that the rolling body contacts the control ball at points in the plane passing through the axis of the rolling body and through the center of the control ball.

10. A device according to claim 2, wherein at least those parts of the rolling body which are in contact with the control ball are made of plastic.

11. A device according to claim 3, wherein at least those parts of the rolling body which are in contact with the control ball are made of plastic.

12. A device according to claim 6, wherein at least those parts of the rolling body which are in contact with the control ball are made of plastic.

13. A device according to claim 7, wherein at least those parts of the rolling body which are in contact with the control ball are made of plastic.

14. A device according to claim 8, wherein at least those parts of the rolling body which are in contact with the control ball are made of plastic.

15. A device according to claim 9, wherein at least those parts of the rolling body which are in contact with the control ball are made of plastic.

* * * * *